United States Patent Office 3,730,936
Patented May 1, 1973

3,730,936
GLASS-FIBER REINFORCED POLYURETHANE
ELASTOMERS
Ernst Bugmann, Zurich, Switzerland, assignor to
Unilan A.G., Chur, Switzerland
No Drawing. Continuation-in-part of application Ser. No.
719,249, Apr. 5, 1968. This application Jan. 15, 1971,
Ser. No. 106,927
Int. Cl. C08g 51/10
U.S. Cl. 260—37 N          2 Claims

ABSTRACT OF THE DISCLOSURE

A substantially non-porous polyurethane adapted to be injection molded, extruded or similarly thermoplastically processed containing glass fibers is substantially transparent and has improved physical properties when the polyurethane is prepared by reacting an organic diisocyanate with a hydroxyl terminated polycaprolactone and a glycol, preferably, hydroquinone glycol ether.

This application is a continuation-in-part of my application Ser. No. 719,249, filed Apr. 5, 1968, now abandoned.

This invention relates generaly to thermoplastic substantially non-porous polycaprolactone polyurethanes and more particularly to a method for improving the physical properties thereof.

Although a major proportion of the substantially non-porous polyurethanes produced commercially are the reaction products of a polyester prepared from a dicarboxylic acid and a glycol or a poly(tetramethylene ether) glycol with an organic diisocyanate, it has been proposed heretofore to make a polycaprolactone polyurethane. For example, U.S. 2,933,478 discloses a process for making a polycaprolactone polyurethane gum stock which can be cured by reaction with additional diisocyanate on a rubber mill. A process for making a porous polyurethane or foam is disclosed in U.S. 2,962,455. Foams containing glass fibers may be prepared as disclosed in U.S. 3,400,085 by reacting an organic polyisocyanate with a poly(alkylene ether)glycol or a polyester prepared by esterifying a polycarboxylic acid and a polyhydric alcohol. It has also been proposed in U.S. 3,464,935 to incorporate glass-fibers in poly(alkylene ether)polyurethanes but such polyurethanes are non-elastomeric and tend to be translucent. In accordance with the disclosure in U.S. 3,491,051 glass fibers are incorporated in a poly(alkylene ether) polyurethane dispersion but such products also tend to be translucent and to have non-elastomeric properties and are not adapted to be extruded, injection molded or similarly processed.

An object of this invention is to provide a polyurethane which can be thermoplastically processed to produce a product having improved physical properties. Another object of the invention is to provide a polyurethane adapted to be injection molded to form a substantially non-porous, transparent polyurethane having improved physical properties. A still further object of the invention is to provide a substantially non-porous thermoplastically polyurethane adapted for making thin walled articles which must combine good elasticity with compressive strength. A more specific object of the invention is to provide thermoplastic processable polyurethane elastomers reinforced by unoriented glass fibers and having greater hardness and modulus than non-reinforced elastomers of similar chemical composition.

In accordance with the invention, glass fibers in the form of unoriented staple fibers are uniformly distributed in a reaction mixture consisting essentially of a hydroxy-terminated polycaprolactone, a chain-lengthening glycol and a diisocyanate while the reaction mixture is in the liquid state. After the reaction is complete and a solid, glass fiber-containing polymer is formed, it can be granulated and processed in conventional manner into finished objects with conventional thermoplastic processing machines.

The hydroxy-terminated polycaprolactone component of the polymer mass is a copolymer of an epsilon-caprolactone with a glycol, preferably diethylene glycol. It has free terminal hydroxyl groups, a substantially linear structure, and an average molecular weight between about 1000 and about 3000. Average molecular weights of about 2000 are preferred. It is prepared by admixing an epsilon-caprolactone with a glycol in a molar ratio of from about 3:1 to about 30:1, lactone to glycol ratios of the order of 10:1 to 20:1 being preferred to obtain molecular weights most desirably of about 2000. This is done under substantially anhydrous conditions at from about 50° C. to 300° C., preferably about 120° C. to 200° C. to avoid unduly slow reaction speeds at temperatures in the lower portion, and excessive decomposition at elevated temperatures in the upper portion of the 50° C. to 300° C. range. A catalyst is not required to achieve reaction. However, catalysts such as calcium and potassium carbonate in concentrations of about 0.001 to about 0.5% by weight can be used to accelerate the reaction if desired.

The glycol component of the reaction acts as an initiator open the lactone ring, whereupon a succession of lactone moieties are added to the remaining glycol moiety to form a hydroxy-terminated polymer whose chain length and molecular weight can be controled as indicated in the equation:

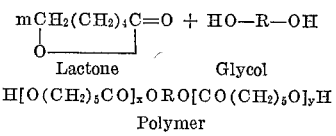

$$\text{H}[\text{O}(\text{CH}_2)_5\text{CO}]_x\text{ORO}[\text{CO}(\text{CH}_2)_5\text{O}]_y\text{H}$$

Polymer the sum of $x$ and $y$ being $m$ and a minimum of 3.

It will be apparent from this that the active hydrogen atoms in the hydroxyl groups of the glycol initially open the lactone ring and that consequently, a wide variety of diols which are liquid under the reaction conditions may be employed to produce a linear lactone polymer. Diols that are particularly useful and desirable for this purpose are:

alkylene glycols, $\text{HO}(\text{CH}_2)_n\text{OH}$ where $n=1$ to 40;
oxyalkylene glycols, $\text{HO}(\text{CH}_2\text{CH}_2\text{O})_n\text{H}$ wherein $n=2$ to 40;
glycols of the formula $\text{HO}[\text{CH}(\text{CH}_3)\text{CH}_2\text{O}]_n\text{H}$ wherein $n=40$;
glycols of the formula $\text{HO}(\text{CH}_2)_n\text{ORO}(\text{CH}_2)_n\text{OH}$ wherein $n=1$ to 12 and R is phenylene or naphthylene ($o$, $m$ or $p$).

The chain-lengthening glycol used in the subsequent reaction with the hydroxy-terminated polycaprolactone may likewise be any of a wide variety of diols such as the glycols identified specifically above. It may be the same as the glycol used as initiator to form the hydroxy-terminated polycaprolactone, or it may be different. 1,4-butanediol and hydroquinone-dkglycolether, examples of the first and last groups identified, are particularly desirable.

The organic diisocyanate component may be aromatic or aliphatic. Diphenylmethane-4,4'-diisocyanate and hexamethylene diisocyanate are particularly suitable.

The elastomers of the invention can be prepared in an essentially single step process in which the chain lengthening glycol is added to the hydroxy-terminated polycaprolactone component heated to about 105° C. to about 160° C., and the mixture is reacted immediately thereafter at a temperature between about (±5° C.) 85° C. and about 150° C. with the diisocyanate component. In another embodiment of the method of the invention, the polycaprolactone and diisocyanate components are admixed with one another and the glycol component is added to the mixture immediately thereafter under the latter temperature conditions.

The molar ratios of polycaprolactone plus chain-extending glycol to diisocyanate, and of glycol to diisocyanate may also vary within wide limits, depending upon such factors as the properties, especially hardness, ultimately desired in the elastomer and the molecular size of the glycol. Thus, as shown in the examples forming part of this application, the molar ratio of hydroxyl-terminated polycaprolactone and glycol to diisocyanate may vary at least as much as from 1:0.8 to 1:1.3, and of glycol to diisocyanate from 1:1 to 1:4.

The admixture of the reaction components can be carried out manually or by machine, batchwise or continuously. In batchwise operations, the mixed reaction components are poured on heated sheet metal while they are still in the liquid state after up to 20% by weight, based on the weight of reaction mix, of glass fibers have been placed on the sheet metal. The polymer mass is maintained on the sheet metal at between about 115° C. and 125° C. for six to ten minutes and removed after complete solidification. Departures from these conditions to temperatures as low as 110° C. and as high as 130° C. and to residence times as low as four and as high as fifteen minutes are permissible but not advisable because of the possibilities of premature chilling or reduced storability. After storage for about four days at room temperature, the polymerized mass can be granulated and processed in the conventional manner into finished parts by conventional thermoplastic processing machines.

In continuous operation, a moving and heated surface, such as a metal conveyor belt, is loaded continuously with glass fiber fleece which is saturated uniformly with a liquid reaction melt which is fed simultaneously. The solidified polymer, after a residence time on the conveyer of from about six to ten minutes at 115° C. to 125° C., can subsequently be removed, stored, granulated and processed as described above.

It has been found desirable in practice to limit the amount of fiber filling material to about 5% to 20% by weight based on the weight of the polyurethane mass, although no great disadvantages are encountered if the amount of glass fiber is less than 5% or more than 20% by weight. A content of 10% to 15% by weight is most advantageous.

The incorporation of glass fibers into the polycaprolactone polyurethane elastomer material results in a general improvement of the physical structure, particularly improvements in resilience, modulus of elasticity and hardness. These improvements are particularly great in elastomers formed by the use of hydroquinone diglycolether as the chain-lengthening glycol.

It is surprising that the incorporation of glass fibers has no measurable optical effect on the elastomers and that the fiber-reinforced final products processed therefrom by thermoplastic molding are transparent. This is surprising because a similar effect does not occur when glass fibers are incorporated into polyether-based polyurethane elastomers or into the conventional polyester polyurethane elastomers prepared from polyesters which are the esterification product of a dicarboxylic acid such as adipic acid and a glycol. Also, the physical properties of the polyurethane elastomers are improved to a surprisingly greater extent than was to be expected from the improvements achieved by incorporation of glass fibers into conventional polyester polyurethanes and polyether polyurethane elastomers.

The elastomers prepared in accordance with the present invention open the possibility of utilizing thermoplastically moldable polyurethane elastomers in new fields of use heretofore closed to such elastomers. Thus, for example, their improved physical properties make it possible to employ the elastomers in the form of thin-walled parts which require excellent elasticity as well as a certain amount of stiffness and compressive strength, e.g., as seals for ball bearings, roller bearings, bearing bushings valve seats, etc.

The shelf life of the glass-fiber filled polycaprolactone polyester polyurethane is practically unlimited at room temperature. At significantly higher temperatures shelf life is reduced, the degree of reduction being dependent on the temperature and the time of exposure thereto. As indicated by the densities shown in Tables 1 and 2, the thermoplastic polyurethane is a substantially non-porous product.

The utility and advantages of the invention will become further apparent from the following examples illustrating the best modes now contemplated for practicing the invention.

EXAMPLE 1

1000 parts by weight of a linear hydroxyl-terminated polycaprolactone having a molecular weight of 2000 and a hydroxyl number of 56 are mixed under anhydrous conditions at 105° C. with 220 parts by weight of 1,4-butanediol and 17 parts by weight of a carbodiimide-based hydrolysis protective agent and then reacted at 85° C. with 800 parts by weight of finely crystalline or powdery diphenylmethane-4,4′ - diisocyanate. After stirring for about two minutes, the resulting polymer mass, while still in the liquid state, is poured on heated sheet metal, onto which glass fleece of unoriented staple fibers, in an amount of about 15% by weight of the poured polymer, had previously been placed. The polymer mass is maintained at about 115° C. to 120° C. for another six to ten minutes and then removed after complete solidification. After storage for up to four days at room temperature, the polymer product can be granulated and processed into a finished part in the normal manner on the usual thermoplast processing machines.

Test pieces molded from the polymer having glass fiber contents of 0, 5%, 10%, and 15%, were tested to compare their pertinent physical properties. The results are shown in Table 1.

TABLE 1

|  |  | Standard, glass fiber content | | | |
| --- | --- | --- | --- | --- | --- |
|  | DIN | None | 5% | 10% | 15% |
| Density, g./cm.$^3$ | 53,550 | 1.19 | 1.22 | 1.25 | 1.27 |
| Shore D Hardness, degrees | 53,505 | 50±3 | 58 | 62 | 64 |
| Tensile strength, kp./cm.$^2$ | 53,504 | 450 | 350 | 350 | 400 |
| Stress at— | | | | | |
| 10% elongation, kp./cm.$^2$ | 53,504 | 95 | 180 | 270 | 300 |
| 20% elongation, kp./cm.$^2$ | 53,504 | 125 | 220 | 340 | 390 |
| Elongation at break, percent | 53,504 | 450 | 150 | 70 | 60 |
| Tear propagation resistance, kp./cm | 53,515 | 115 | 135 | 150 | 160 |
| Rebound, percent | 53,512 | 35 | 40 | 42 | 45 |
| Abrasion, mm.$^3$ | 53,516 | 60 | 80 | 90 | 100 |

EXAMPLE 2

1000 parts by weight of linear hydroxyl-terminated polycaprolactone having a molecular weight of 2000 and a hydroxyl number of 56 are mixed under anhydrous conditions at 100° C. with 189 parts by weight of hydroquinone diglycolether and 3 parts by weight of trimethylolpropane, and then reacted at 110° C. with 450 parts by weight of finely crystalline, powdery diphenylmethane-4,4′-diisocyanate. After stirring for about two minutes, the resulting polymer mass, while still in the liquid state, is poured on heated sheet metal maintained at a temperature of 150° C., onto which a glass fleece of unoriented staple fibers had previously been placed. Subsequent treatment was the same, and the results thereon were similar, to those described in Example 1.

EXAMPLE 3

1000 parts by weight of a linear hydroxyl-terminated polycaprolactone having a molecular weight of 3000 and a hydroxyl number of 37 was admixed with 165 parts by weight of hydroquinone diglycolether and 240 parts by weight of diphenylmethane-4,4'-diisocyanate at 120° C. in the same manner as described in Example 2. Subsequent treatment of the resulting polymer mass was the same as in Example 1.

EXAMPLE 4

The procedure was the same as in Example 2 except for the facts that the 1000 parts per weight of a linear hydroxyl-terminated polycaprolactone having a molecular weight of 1000 and a hydroxyl number of 123, and 610 parts by weight of diphenylmethane-4,4'-diisocyanate were used and the reaction temperature was 150° C. Subsequent treatment of the resulting polymer mass was the same as described in Example 1.

EXAMPLE 5

The procedure was the same as in Example 1 except that the chain lengthener consisted of 424 parts by weight of 1,4-butanediol and the diisocyanate was 940.8 parts by weight of hexamethylene-1,6-diisocyanate. The chain lengthener mixture was added to the hydroxyl-terminated polycaprolactone at 150° C. and the diisocyanate was added at 115° C. Subsequent treatment of the resulting polymer mass was the same as in Example 1.

EXAMPLE 6

The procedure was the same as in Example 5 except that the linear hydroxyl-terminated caprolactone had a molecular weight of 1250 and a hydroxyl number of 89, the glycol consisted of 68 parts by weight of hydroquinone diglycolether, 2 parts by weight of trimethylolpropane were present, and 235 parts of hexamethylene-1,6-diisocyanate were used. The glycol and trimethylolpropane were added at 160° C. and the diisocyanate was added at 150° C. Subsequent treatment of the polymer mass was the same as in Example 1.

EXAMPLE 7

1000 parts by weight of linear hydroxyl-terminated polycaprolactone having a mean molecular weight of 2080 and a hydroxyl number of 54 are mixed under anhydrous conditions at 100° C. with 304 parts by weight of hydroquinone diglycolether and 3 parts by weight of trimethylolpropane, and then reacted at 110° C. with 600 parts by weight of finely crystalline, powdery diphenylmethane-4,4'-diisocyanate. After stirring for about two minutes, the resulting polymer mass, while still in the liquid state, is poured on heated sheet metal maintained at a temperature of 150° C., onto which no, or 15% by weight glass fleece of unoriented staple fibers had previously been placed. Subsequent treatment was the same as that described in Example 1. The results are shown in Table 2.

TABLE 2

| | Standard, DIN | glass fiber content None | 15% |
|---|---|---|---|
| Density, gm./cm.³ | 1,306 | 1.21 | 1.25 |
| Hardness Shore A, degrees | 53,505 | 95 | 96 |
| Tensile strength, kp./cm.³ | 53,504 | 240 | 268 |
| Abrasion, mm.³ | 53,516 | 178 | 144 |
| Rebound, percent | 53,512 | 33 | 40 |
| Modulus: | | | |
| 14% | 53,504 | 77 | 212 |
| 28% | 53,504 | 99 | 230 |
| 100% | 53,504 | 128 | |
| 200% | 53,504 | 163 | |
| Young modulus, kg./cm.² | | 209 | 520 |
| Elongation at break, percent | 53,504 | 370 | 78 |

What is claimed is:

1. A substantially non-porous polyurethane composition adapted to be injection molded, extruded or similarly thermoplastically processed into an elastomeric product having greater hardness and modulus which comprises the reaction product prepared by the process which comprises reacting a polycaprolactone having terminal hydroxyl groups and a molecular weight of from about 2000 to about 3000, a hydroquinone diglycol ether or 1,4-butanediol chain extender and 4,4'-diphenyl methane diisocyanate or hexamethylene diisocyanate in a mixture thereof containing from about 5% to about 20% by weight non-oriented glass fibers until the mixture solidifies but interrupting the reaction by cooling the mixture below reaction temperature before a polyurethane which can no longer be thermoplastically processed is obtained, the molar ratio of diisocyanate to polycaprolactone plus chain extender being from about 0.8 to 1.3 to 1 and the diisocyanate to chain extender ratio from being from about 1 to 1.4 to 1.

2. The product of claim 1 wherein the chain extender is a hydroquinone diglycol ether.

References Cited

UNITED STATES PATENTS

| 2,933,478 | 4/1960 | Young et al. | 260—77.5 AN |
| 2,962,455 | 11/1960 | Hostettler et al. | 260—37 N |
| 2,962,524 | 11/1960 | Hostettler et al. | 260—77.5 AN |
| 3,061,497 | 10/1962 | Wilson et al. | 260—37 N |
| 3,169,945 | 2/1965 | Hostettler et al. | 260—37 N |
| 3,309,261 | 3/1967 | Schiller et al. | 260—37 N |
| 3,400,085 | 9/1968 | Kujawa et al. | 260—37 N |
| 3,418,268 | 12/1968 | Hedrick et al. | 260—37 N |
| 3,464,935 | 9/1969 | Sepkoski et al. | 260—37 N |
| 3,491,050 | 1/1970 | Keberle et al. | 260—37 N |
| 3,629,200 | 12/1971 | Brotherten et al. | 260—37 N |

ALLAN LIEBERMAN, Primary Examiner

U.S. Cl. X.R.

260—47 CB, 77.5 AT